UNITED STATES PATENT OFFICE.

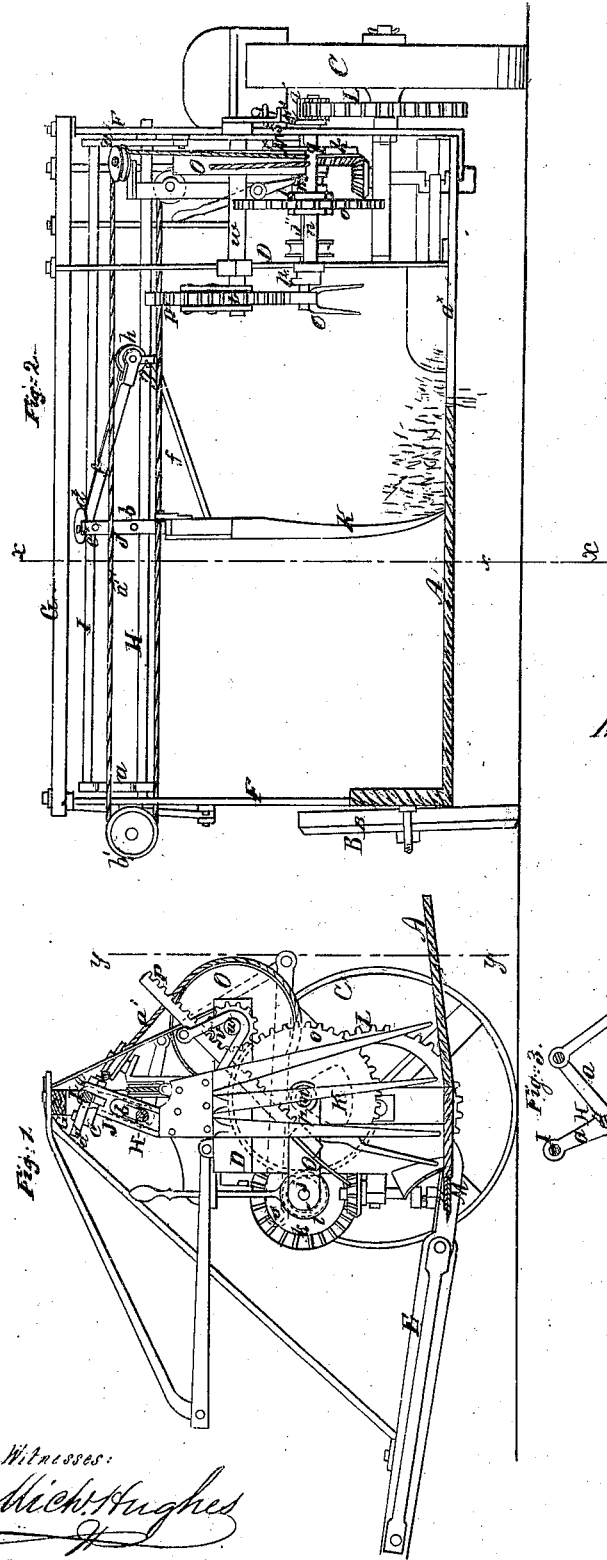

JESSE WHITEHEAD, OF MANCHESTER, VIRGINIA.

IMPROVEMENT IN HARVESTING-MACHINES.

Specification forming part of Letters Patent No. 24,170, dated May 24, 1859.

*To all whom it may concern:*

Be it known that I, JESSE WHITEHEAD, of Manchester, in the county of Chesterfield and State of Virginia, have invented a new and Improved Raking Attachment for Harvesters; and I do hereby declare that the following is a full, clear, and exact description of the same, reference being had to the annexed drawings, making part of this specification, in which—

Figure 1 is a transverse vertical section of a harvester with my improvement applied to it. $x\,x$, Fig. 2, indicates the plane of section. Fig. 2 is a back sectional view of the same, taken in the line $y\,y$, Fig. 1. Fig. 3 is a detached section of a portion of my invention.

Similar letters of reference indicate corresponding parts in the several figures.

This invention relates to an improvement in an automatic raking attachment, for which Letters Patent bearing date December 2, 1856, were granted to me.

The object of the within-described invention is to render the device more compact than formerly, and also to insure the free discharge of the grain, so that the same will be delivered in compact gavels, and therefore bound into sheaves with facility.

To enable those skilled in the art to fully understand and construct my invention, I will proceed to describe it.

A represents the platform of a harvester supported at one end by a grain-wheel, B, and at the opposite end by a driving-wheel, C, adjoining which and to the platform an upright framing, D, is attached to support the principal part of the gearing or working parts of the machine. The platform A directly behind the framing D is hollowed out to form a discharging-recess, $a^x$, as shown in Fig. 2.

Directly in front of the framing D a draft-pole, E, is attached, and to each end of the platform A an upright support, F, is secured, the upper ends of which are connected by a cross-bar, G.

Between the upper parts of the supports F F, and just below the bar G and parallel with it, a shaft, H, is placed. This shaft is allowed to turn freely in its bearings, and it has two arms, $a\,a$, attached to it, one near each end, said arms being connected by a rod, I, which is parallel with the shaft H, as shown plainly in Fig. 2. On the shaft H a rake-head, J, is placed and allowed to slide freely back and forth thereon. This rake-head is simply a metal bar having a friction-roller, $b$, placed in it, which roller rests on the shaft H. The upper part of the bar has an arm, $c$, attached to it at right angles, said arm also having a friction-roller, $d$, attached to it, which roller bears against the side of the rod I, the latter being between the roller $d$ and a ledge, $e$, on the head J, as shown clearly in Fig. 1.

To the rake-head J a rake, K, is attached, the teeth of which extend down nearly to the platform A, just clearing it, and to one side of the head J two oblique bars, $f\,f$, are attached, in one of which an eye, $g$, is formed to allow the shaft H to pass through, and the other having a friction-roller, $h$, in it to bear on said shaft. (See Figs. 1 and 2.)

The axis of the driving-wheel C has a toothed wheel, L, attached to it, and this wheel gears into a pinion, $i$, which is placed on a shaft, $j$, in the framing D. On this shaft $j$ a toothed wheel, $k$, is permanently secured, from which wheel $k$ the sickle M is driven, and on the shaft $j$ a pinion, $l$, is placed loosely and connected with the wheel $k$, when desired, by means of a clutch, $m$.

In the framing D a shaft, $n$, is placed, said shaft having a toothed wheel, $o$, secured on it, said wheel gearing into the pinion $l$. At the inner end of the shaft $n$ a crank, $p$, is secured, and on its outer end a sector-shaped cam, $q$, is placed. The form of this cam is shown plainly in Fig. 3.

N is a lever which has a friction-roller, $r$, attached, and which rests on the cam $q$. This lever has its fulcrum-pin at $s$ in the framing D, and the outer end of the lever N is connected by a link, $t$, to an arm, $u$, which projects from the shaft H. (See Fig. 3.)

To the crank $p$ or shaft $n$ a rake, O, is attached, the shaft or bar P of which is toothed, forming a rack which gears into a pinion, $v$, said pinion being on a shaft, $w$, in the framing D. On this shaft $w$ a wheel, Q, is placed, said wheel having a cord or chain, $a'$, attached. This cord or chain is attached to the rake-head J, and it passes around a pulley, $b'$, which is attached to the upright F at the outer end of the platform A.

To the outer end of shaft $j$ a lever, $c'$, is attached, by actuating which the pinion $i$ may be thrown out of gear with the wheel L, thereby disconnecting the sickle M from the driving mechanism.

The operation is as follows: As the machine is drawn along the crank $p$ of shaft $n$ gives an up-and-down movement to the rake O, and also a movement over the platform A from its front to its back edge, the plane of the movement of rake O being coincident with the recess $a^\times$ in the platform. The rock-bar P of the rake O communicates a reciprocating rotating movement to the shaft $w$ and wheel Q, and consequently a reciprocating movement will be given the rake K by means of the cord or chain $a'$ and wheel $o$, the movement of rake K being equal to the length of the platform A. The rake K, however, has two movements, the reciprocating one just referred to, and a backward inclined movement effected through the medium of the cam $q$, lever N, and arm $u$ of shaft H. The cam $q$ actuates the lever N at the termination of the inward movement of the rake K, and turns shaft H so that the rake K will be inclined backward free from the platform A, (see dotted lines, Fig. 3,) and remain in that position during its movement to the outer end of the platform A, this latter position of the rake permitting the cut grain to fall unobstructed on the platform. The rake K at the termination of its outward movement assumes a vertical position, and during its inward movement toward rake O gathers the cut grain on the platform into a gavel just back of rake O. At this instant the rake K is thrown backward by means previously referred to, and the rake O also moves backward and throws the gavel from the platform. It will be seen that the rake K has a tendency to discharge the gavel by its backward movement, but its operation in that respect is not always certain. The operation of rake O insures the result. The oblique bars $f\,f$ serve as a guide to the rake-head J, effectually preventing the same from binding on shaft H, and enabling me to dispense with the cumbrous guide-bar used in the machine formerly patented. The longitudinal movement of the shaft H is also dispensed with and the device rendered more compact. The employment of the supplemental discharging-rake O is also a valuable acquisition, as by its use the gavels are discharged in compact form, far more so than by the machine formerly patented by me, and the gavels may consequently be bound into sheaves with greater facility.

I do not claim giving a reciprocating movement to the rake K by means of the cord $a'$ and reciprocating wheel Q. Neither do I claim broadly a reciprocating and tilting rake, for such devices, differently arranged, were used in connection with auxiliary mechanism in the machine formerly patented by me; but I do claim as new and desire to secure by Letters Patent—

1. The supplemental discharging-rake $o$, arranged with its actuating mechanism, substantially as shown and described, so as to operate automatically and conjointly with the platform-rake K, for the purpose specified.

2. Attaching or suspending the rake-head J to the shaft H by means of the pulley $d$, rod I, oblique bars $f\,f$, and pulley $h$, substantially as shown and described, whereby the head J is allowed to vibrate and is properly guided or retained on the shaft H.

JESSE WHITEHEAD.

Witnesses:
 MICH. HUGHES,
 M. M. LIVINGSTON.